United States Patent
Filbrun et al.

(12) 
(10) Patent No.: US 6,550,948 B1
(45) Date of Patent: Apr. 22, 2003

(54) ONE PIECE BRACKET AND HOUSING FOR MOTOR VEHICLE LAMP

(75) Inventors: Nova K. Filbrun, Pendleton, IN (US); Kenneth L. Trimpe, Pendleton, IN (US)

(73) Assignee: Guide Corporation, Pendleton, IN (US)

( * ) Notice: Subject to any disclaimer, the term of this patent is extended or adjusted under 35 U.S.C. 154(b) by 0 days.

(21) Appl. No.: 09/707,106

(22) Filed: Nov. 6, 2000

(51) Int. Cl.$^7$ ................................................ B60Q 1/06
(52) U.S. Cl. .................. 362/523; 362/306; 362/427; 362/428; 362/514; 362/273; 362/289
(58) Field of Search ................. 362/523, 514, 362/427, 428, 287, 288, 274, 273, 289, 269, 306

(56) References Cited

U.S. PATENT DOCUMENTS

| | | | | |
|---|---|---|---|---|
| 4,580,202 A | * | 4/1986 | Morette | 362/273 |
| 4,722,032 A | * | 1/1988 | Kulka | 362/80 |
| 4,731,713 A | | 3/1988 | Perthus | 362/302 |
| 5,430,623 A | | 7/1995 | Uchida | 362/61 |
| 5,488,546 A | | 1/1996 | Sato et al. | 362/61 |
| 5,526,238 A | | 6/1996 | Van Oel et al. | 362/66 |
| 5,707,134 A | | 1/1998 | Nishizawa | 362/66 |
| 5,743,618 A | | 4/1998 | Fujino et al. | 362/61 |
| 6,241,373 B1 | * | 6/2001 | Kelley et al. | 362/545 |
| 6,332,695 B1 | * | 12/2001 | Wang | 362/277 |
| 6,471,374 B1 | * | 10/2002 | Thomas et al. | 362/285 |

* cited by examiner

*Primary Examiner*—Sandra O'Shea
*Assistant Examiner*—Anabel Ton
(74) *Attorney, Agent, or Firm*—Rachel L. St. Peter; Brian T. Ster; Ice Miller

(57) ABSTRACT

Disclosed is an vertically aimable motor vehicle lamp of a one-piece construction. The lamp includes a housing and mounting bracket joined by at least one integral living hinge positioned at the substantial side of the housing at the housing and bracket interface. The integral living hinges define a line of weakness between them about which the housing is pivotable. The housing includes an integral tab extending radially outwardly from the housing and adjacent to the front of the housing. The integral tab is engaged and operable by a vertical-direction adjuster. Further, the one-piece bracket and housing are suitable for manufacture via injection molding and may, because they are a unitary element, be molded in a single injection.

14 Claims, 5 Drawing Sheets

ONE PIECE BRACKET AND HOUSING FOR MOTOR VEHICLE LAMP

The present invention relates generally to motor vehicle lamps. More specifically, the present invention relates to aimable retention assemblies for aiming the beams of motor vehicle lamps with respect to the vehicle.

BACKGROUND

Motor vehicles are required to have external illumination provided by vehicle lamps such as headlamps, foglamps, and the like for illuminating oncoming road or terrain and signaling the drivers of other vehicles. Vehicle lamps illuminate approaching roadway or terrain by projecting a light forward of a vehicle. Indeed, vehicle lamps are a significant safety feature of modern vehicles, and their use is both common and well known in the art.

Vehicle lamps are often designed as sealed assemblies which are incorporated into a vehicle's front end. To this end, vehicle lamp assemblies are designed and constructed to conform to the space limitations and the aerodynamic requirements of each vehicle. Further, to maintain proper angular orientation of the lamps with respect to the vehicle, vehicle lamps are commonly provided with aiming mechanisms which both aim and support the lamp.

A typical aiming mechanism comprises three supports: one horizontal adjusting mechanism, one vertical adjusting mechanism, and one a pivotal connection. The relative placement of the pivotal connection and the horizontal and vertical adjusting mechanisms are such that the horizontal adjuster is displaced horizontally, and the vertical adjusts vertically, from the pivotal connection. All three of the supports are weight-bearing in that they bear the weight of the lamp unit while supporting it within a mounting bracket attached to the vehicle. In addition, all three supports provide a means for adjusting the orientation of the lamp unit in relation to the support frame about vertical and horizontal axes of adjustment.

Generally, the horizontal and vertical adjusters comprise spring biased screws which support the lamp unit in a cantilevered relationship where one end of the screw is attached to the support frame while the other end is attached to the lamp unit. By axially rotating the screw, the point at which the screw is attached to the lamp unit is either moved towards or away from the support frame, depending on the direction of rotation. When the horizontal adjusting screw is thus rotated, the lamp pivots about the vertical adjusting screw and the pivot. Together, the vertical adjusting screw and pivot define the vertical axis of adjustment. In a similar fashion, when the vertical adjusting screw is axially rotated, the lamp unit pivots about its horizontal axis of adjustment, which is defined by the horizontal adjusting screw and the pivot. In this manner, the direction of a light beam emanating from the lamp unit can be adjusted in a horizontal plane and in a vertical plane to achieve a desired orientation.

Typically, aimable vehicle lamps are retained in mounting brackets which brackets are adapted and configured to be mounted in a motor vehicle. Further, as a result of advances in plastics technology, manufacturers are increasingly fabricating mounting brackets out of plastic or plastic-like substances.

Conventionally, lamp housings and brackets are manufactured as separate components by injection molding or other plastic molding techniques. Subsequently, the separate components are assembled with additional hardware for later installation in a vehicle during vehicle production.

In the design and manufacture of vehicle lamps, it has been long recognized that even relatively small manufacturing cost savings per part can be desirable. This is so because lamp components are typically mass produced by injection molding or other plastic forming techniques. Furthermore, they are designed to be interchangeable, that is designed to the space limitations and aerodynamic requirements of multiple styles of vehicles of similar design. Consequently, over the long run these small savings may add up to substantial amounts. It is this savings that may differentiate one unit from the competition. Therefore, vehicles are designed to be economical in materials, parts and assembly.

It should be appreciated that the light beam patterns for vehicle headlamps and vehicle foglamps are substantially dissimilar. Fog droplet tend to scatter light, producing considerable glare which diminishes driver visibility. To avoid this problem, the light beam from a foglamp is projected downwardly to reach the ground a short distance ahead of the vehicle. Any longer projection of this light beam is undesirable as it results in increased glare. In contrast, vehicle headlamps are required to project a light beam for a considerable distance from the vehicle. To this end, vehicle lamps employed as headlamps are aimed in a substantially horizontal direction rather than in a downward direction so as to illuminate an adequate portion of oncoming terrain while not presenting a dangerous condition for oncoming drivers, such as glare to the occupants of oncoming vehicles.

Since foglamps are generally aimed relatively closely to the forward end of the vehicle, their horizontal alignment is generally not as significant to performance as their vertical alignment. Indeed, vertically misaligned foglamps may either not provide a vehicle operator with sufficient forward illumination, or temporarily blind other drivers on the road, or both. Further, federal, state and many local jurisdictions have promulgated regulations concerning the vertical alignment of vehicle lamps. Thus, proper alignment of a vehicle's foglamps is of extreme importance and myriad vehicle lamp mounting and adjustment arrangements are thus well-known in the art.

As discussed, in conventional adjust and support apparatus, the horizontal and vertical mechanisms serve the dual functions of support and adjustment. However, for the reasons discussed herein, horizontal adjustment of foglamps is not critical because, unlike headlamps, foglamps typically only require vertical adjustment. Consequently, it has been recognized that the adjustment capability of the horizontal adjustment mechanism is unnecessary. Indeed, the horizontal adjusting mechanism in these prior lamp assemblies need only perform a weight bearing function. Thus, the additional components necessary to provide for both support and adjustment functions render these assemblies unnecessarily complex and expensive. Although the prior art has suggested providing only weight bearing support at the horizontal support points, none have taught or suggested employing a pair of integral living hinges at the horizontal bearing points.

Accordingly, it would be desirable to provide an foglamp assembly which is effective for its intended purpose and low in cost to manufacture and install, and easy to install. Further, it would also be desirable to provide a foglamp assembly comprising the fewest components necessary to suitably retain the housing while providing for vertical adjustment. Still further, while the prior art lamp assemblies allow for the construction of components via injection molding, they do not allow for the housing and bracket to be formed together in a single injection molding cycle. Thus, it would also be desirable to provide a foglamp assembly that can be constructed as one-piece via injection molding.

SUMMARY

In accordance with the present invention, a one-piece housing and bracket vehicle lamp assembly is provided. The one-piece lamp assembly is suitable for use as a foglamp or other type of vehicle lamp. The benefits of the present invention are realized by: employing living hinges integrally connecting the housing and bracket at the side pivot points of the lamp assembly; and molding a radially extending adjustment tab off plane with the bracket. The integral living hinges and the off plane adjustment tab allow for injection molding fabrication in one-step. Further, the integral living hinges of the present invention provide pivotable retention with fewer components than prior art assemblies. Thus, assembly is simplified and costs are reduced. Additionally, obviating the need for more components decreases the number of possible failure points. Further, according to the present invention, the lamp housing and mounting bracket may be constructed as one-piece via an injection molding process. Thus, an overall production economy is realized.

In accordance with the present invention, a vehicle lamp assembly is provided comprising: a reflector housing having an open front end adapted to receive and retain a lens, a rear end opposite the front end adapted to receive a bulb, and configured to reflect light from the bulb through the lens; and a mounting bracket adapted to be mounted to the vehicle. The housing and the mounting bracket are molded as a one-piece assembly with the housing and the mounting bracket being joined along at least one integral living hinge which pivotably supports the housing and defines a pivoting axis about which the housing is pivotably adjustable in relation to the mounting bracket so that the orientation of the housing with respect to the bracket may be adjusted.

In accordance with yet another aspect of the present invention, a vehicle lamp assembly is provided comprising: a housing having an open front end adapted to receive and retain a lens and a rear end adapted to receive and retain a bulb remote from the lens; and a mounting bracket adapted for mounting on a motor vehicle. Also included is a pair of integral living hinges that are integrally with the housing and the mounting bracket in a single unitary molded assembly, the hinges pivotably coupling the housing and the mounting bracket so as to allow adjustable aiming movement of the housing with respect to the mounting bracket. Additionally, an adjuster is disposed between the housing and the mounting bracket foe adjusting the position of the housing with respect to the mounting bracket to direct light emitted from the lens of the assembly in a selected direction. The adjuster is adapted to engage the housing such that the adjuster is capable of pivoting the housing with respect to the mounting bracket along the hinges.

In accordance with yet another aspect of the present invention, a vehicle lamp assembly for emitting light having one-piece construction is provided. The assembly includes a housing pivotably coupled to a mounting bracket as a single unitary unit by a pair of integral living hinges, molded in a single mold. The integral living hinges define a flexible line of weakness between them to allow the housing to be pivoted with respect to the bracket.

In accordance with another aspect of the present invention, a motor vehicle lamp assembly is provided comprising: a reflector housing having an open front end adapted to receive and retain a lens and a rear end adapted to receive and retain a bulb remote from the lens; and a mounting bracket adapted for mounting on a motor vehicle. The housing also includes an integrally molded tab extending radially outwardly adjacent from the open end of the housing which tab is configured to be operable by an adjuster mechanism. The assembly further includes an adjuster disposed between the housing and the mounting bracket for adjusting the position of the housing with respect to the mounting bracket to direct light emitted from the assembly in a selected direction. The adjuster is adapted to engage the tab such that the adjuster is capable of continuously adjusting the position of the housing with respect to the mounting bracket. Additionally, a pair of integral living hinges are integrally molded between the housing and the mounting bracket for pivotably coupling the housing and the mounting bracket so as to allow adjustable aiming movement of the housing with respect to the mounting bracket as directed by the adjuster.

In accordance with still another embodiment of the invention, a method for pivotably adjusting the aim of a foglamp is provided, which method comprises the steps of: providing a one-piece housing and bracket joined at a pair of integral living hinges, the integral living hinges pivotably supporting the housing and defining a pivoting axis about which the housing is pivotable; providing an adjuster for causing the housing to pivotably rotate with respect to the bracket so as to effect adjustment of the aim of the lamp; and adjusting the aim of the lamp by operating the adjuster.

In accordance with another embodiment of the invention, a method for aiming a motor vehicle lamp the type having a housing and bracket of one-piece construction is provided, which method comprises this steps of: pivotably coupling between the housing and bracket via a pair of integrally molded living hinges; providing an adjuster for directing the housing to pivotably rotate so as to effect adjustment of the aim of the lamp; and adjusting the aim of the lamp by operating the adjuster.

In accordance with another embodiment of the invention, a method for adjusting the aim of light emitted from a foglamp assembly is provided, which method comprises: providing a housing with an open front and adapted to receive and retain a lens and a rear end adapter to receive and retain a bulb remote from the lens; providing a bracket adapted for mounting in a motor vehicle; pivotably coupling the housing to the bracket by a pair of integrally molded living hinges; providing an adjuster for directing the housing to pivotably rotate about the hinges so as to effect adjustment of the aim of the lamp; and operating the adjuster to adjust the aim of the lamp.

DETAILED DESCRIPTION

Figure 1:
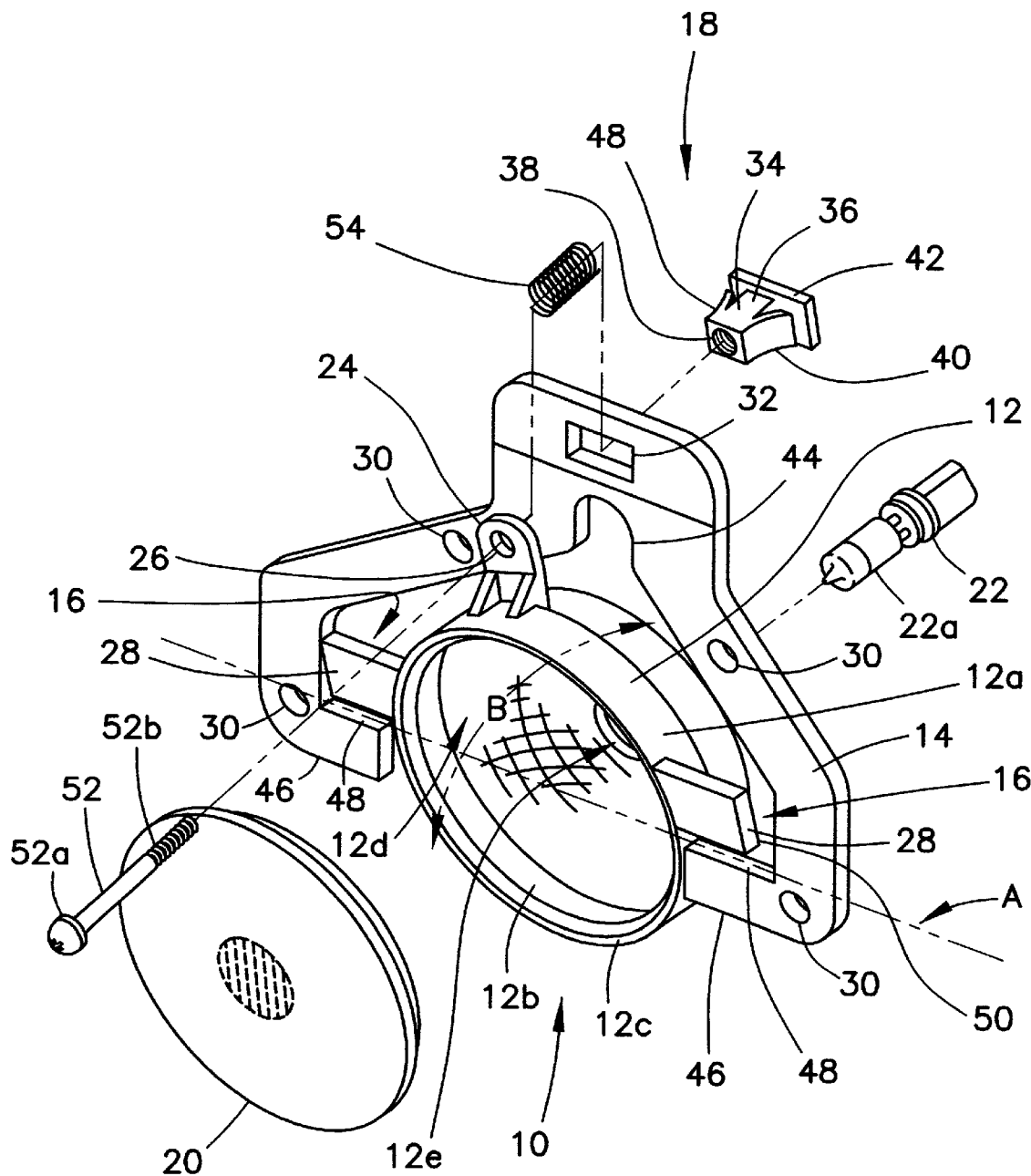
FIG. 1 is an exploded perspective view of an aimable motor vehicle lamp embodying the present invention.
Figure 2:
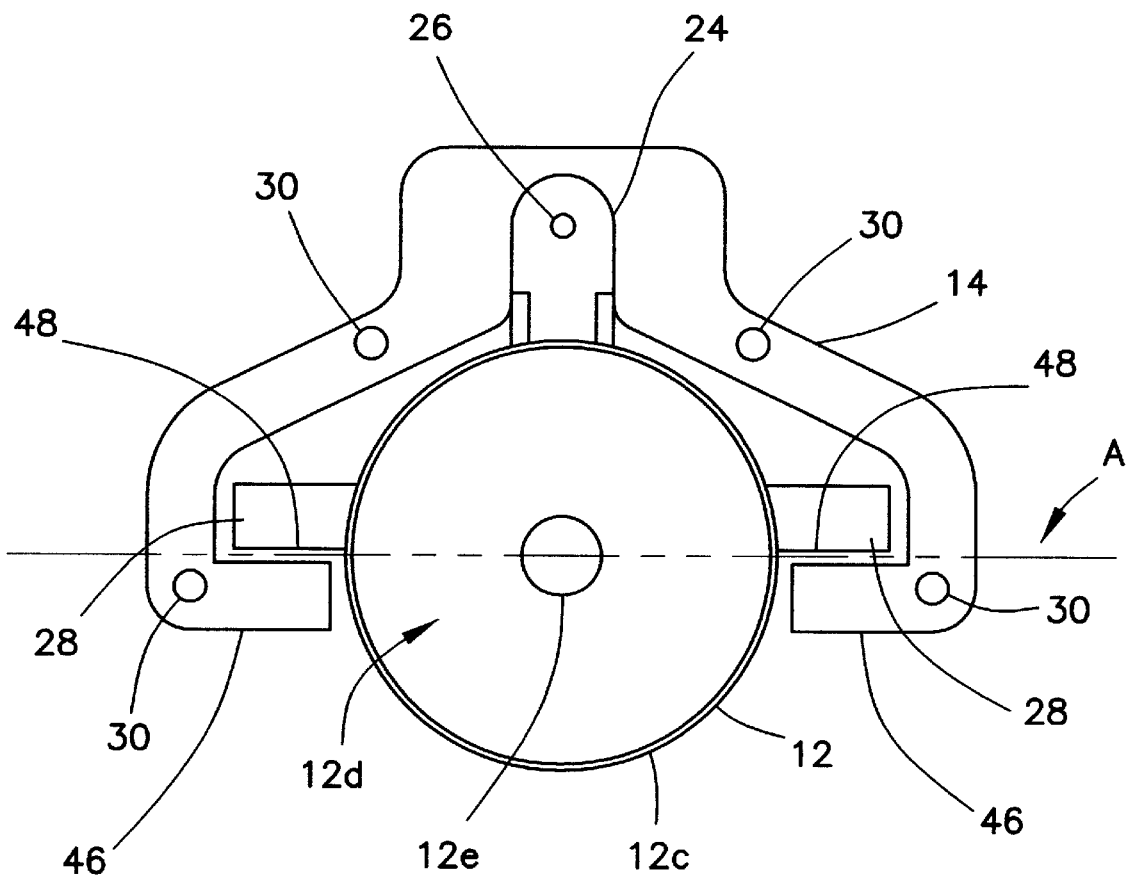
FIG. 2 is a front view of the lamp of FIG. 1.
Figure 3:
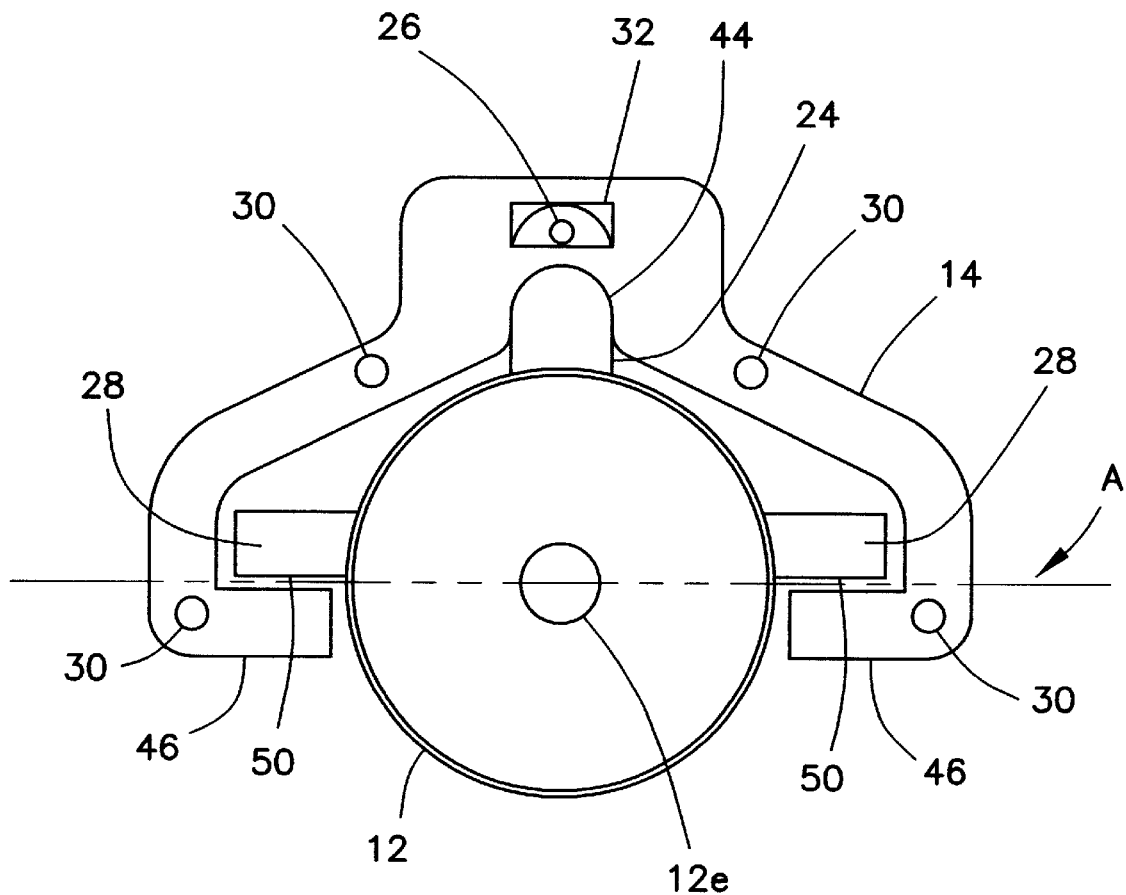
FIG. 3 is a rear view of the lamp of FIG. 1.

The present invention will now be described in detail as embodied in a vehicle lamp assembly of the type in which the lamp housing is tiltable vertically relative to the lamp bracket which is fixed to the vehicle. With reference to FIGS. 1–5, a one-piece bracket and housing lamp assembly 10 capable of vertical aiming adjustment is disclosed. Broadly considered, the lamp assembly of the present invention comprises housing 12, mounting bracket 14, integral living hinges 16 and a vertical adjustment mechanism 18.

The housing 12 molded from engineering plastic includes a main body portion 12a concave in shape and defining an open front end 12b, and an annular flange portion 12c extending outwardly from the main body portion 12a proximate the open front end 12b of the housing. The inner surface of the main body portion 12a is conventionally rendered reflective and configured to reflect the light from a light source such as a discharge bulb in a parallel beam of light out of open front end 12b. Further, open front end 12b and annular flange portion 12c are dimensioned and configured to receive and retain lens 20 at its periphery. The housing 12 further comprises a rear socket portion 12e, adapted to removably receive and retain bulb socket 22 in which a bulb 22a is placed.

Lens 20 is formed of a suitable light transparent or transmissive plastic material such as polycarbonate and has a size configuration corresponding generally to the size and configuration of the open front end 12b of the housing so that the lens may engage and close the open front end 12b of the housing 12 to form an enclosed lamp chamber. As is well known in the art, the lens 20 may be joined to the annular flange portion 12d of the housing in myriad fashions, including adhesive sealants, gasketing materials, or snap-fit construction.

Bulb socket 22 is of conventional construction and is removably received by a socket portion 12e at the back of housing 12 in a known manner such as in a turn lock fashion such that the light emitting portion of the bulb 22a is disposed in the lamp chamber at the focal point of reflective surface 12d. It is preferred that the rear socket portion 12e is provided with a gasket affixed to the perimeter to removably receive and seal the bulb socket 22.

So as to be adjustable by the adjuster mechanism, as is explained in detail below, it will be noted that housing 12 is integrally formed with a tab 24 which extends perpendicularly and radially outwardly from the periphery of housing 12. The tab 24 is located at substantially the top center of housing 12 and at a distance from the periphery of the open front end 12b of the housing 12 such that the tab is located off-plane from the front edge of the periphery of the housing 12. Further, tab 24 is provided with a hole 26 through which an adjustment screw 52 is having threaded shank portion 52b positioned so that tab 24 is seated against an engaging the head portion 52a of the screw.

Also integrally formed with housing 12 are two substantially rectangular radially outwardly extending and circumferential spaced wings 28. The wings 28 are identical in size and configuration and are located in the plane of housing open end 12b such that their bottom surfaces define axis A, which axis bisects the open end 12b of housing 12. The dimension of wings 28 are largely dictated by the structural and production considerations but must, at a minimum, be constructed to adequately support the housing 12. Further, it is to be understood that the location of the wings 28 need not necessarily be such that axis A bisects the housing and could be above or below the axis A.

A lamp assembly 10 in accordance with the present invention also includes mounting bracket 14. The mounting bracket 14 is adapted to be mounted to the vehicle by screws (not shown) installed through screw holes 30 such that lens 20 is flush with the exterior contours of the auto body of the vehicle. The details of construction of these features are largely specified by structural consideration of the manufacturer of the motor vehicle in which the lamp assembly is to be installed. The bracket is substantially flat and shares the same uniform material thickness as wings 28. However, the bracket 14 need not necessarily have the same material thickness as wings 28 and its thickness need not be uniform. The bracket 14 further includes rectangular opening 32 located at its top center dimensioned to retain a socket member 34 in a snap-fit fashion.

The socket member 34 is a one-piece molding including a self-locking snap-in socket portion 36 made from nylon or like plastics. The socket portion 36 includes an internally threaded hole 38 dimensioned and configured to threadedly retain threaded shank 52b of screw 52. A pair of locking prawls 40 extend outwardly and backwardly toward their free ends from the side walls 41 of socket portion 36.

The end of socket portion 36 of the socket member 34 is in the shape of a rectangle and sized to fit into the opening 32 in the mounting bracket 14. The pair of locking prawls 40 will be resiliently deflected toward each other by the pair or opposing edges of walls of the mounting bracket bounded by the opening 32 as the socket portion 36 of socket member 34 is forced into the opening. Upon full insertion of the socket portion 36, that is, upon abutment of the base 42 of the socket member 34 with the rear surface of the mounting bracket 14, the locking prawls will spring back, thereby retaining the socket member 34 in a snap-lock fashion.

Bracket 14 also includes a cutout portion 44. It is to be appreciated that the housing is rotated through its adjustable range through arc B.

The bracket 14 is also configured to include a pair of identically configured arms 46 extending radially inwardly such that the top surface of each of the arms lies on axis A. Additionally, arms 46 lie in the same plane as wings 28.

The housing 12 and bracket 14 of the present invention are joined by what are known as integral living hinges 16. The integral living hinges are flexible polymer plastic and connect the wings 28 and arms 46. Thus, the bracket and housing may be molded as one piece using a single mold. The integral living hinges 16 permit pivotable retention of the housing with respect to the bracket about a flexible line of weakness along axis A.

Figure 4:
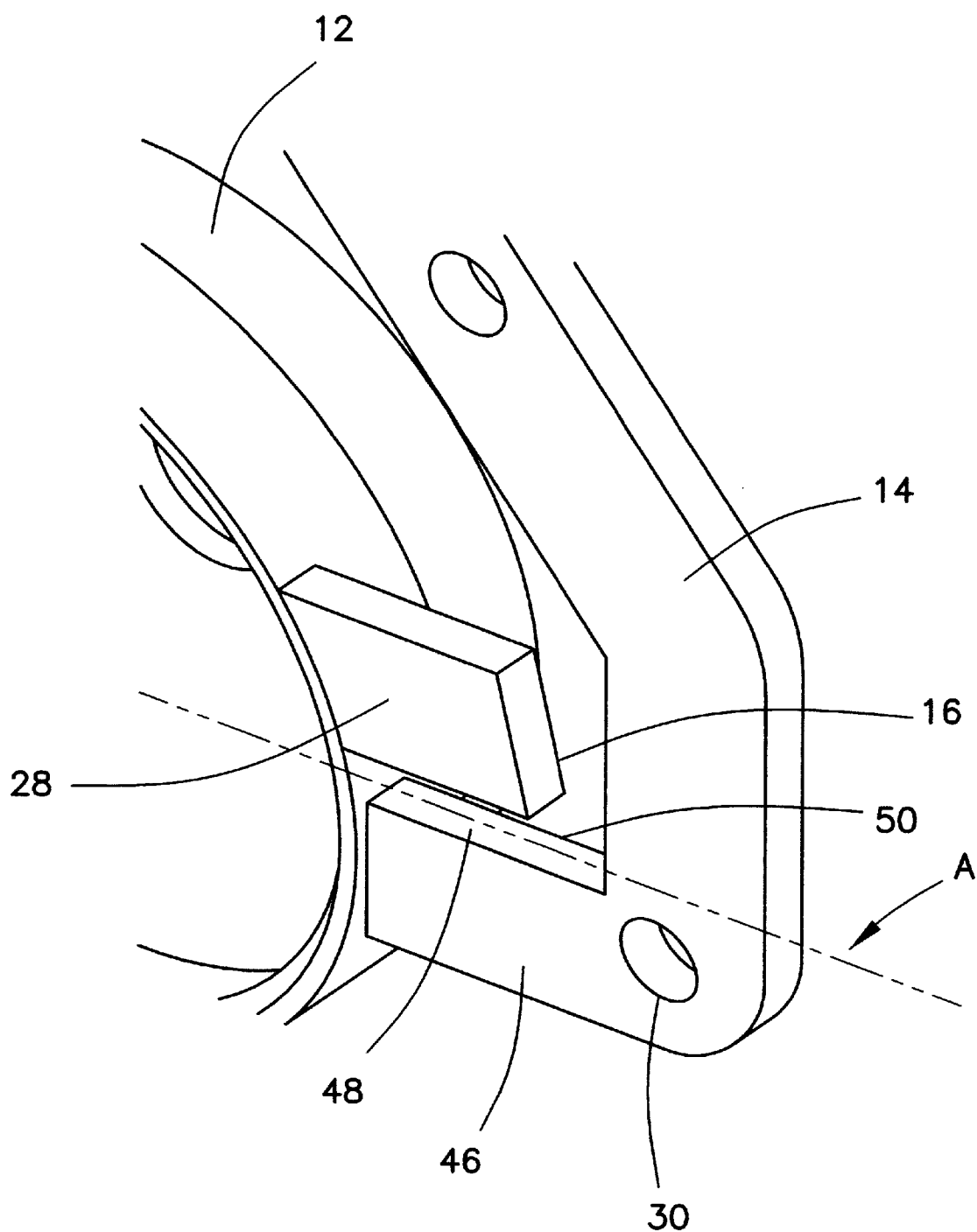
FIG. 4 is an enlarged view of the integral living hinge of the lamp of FIG. 1.
Figure 5:
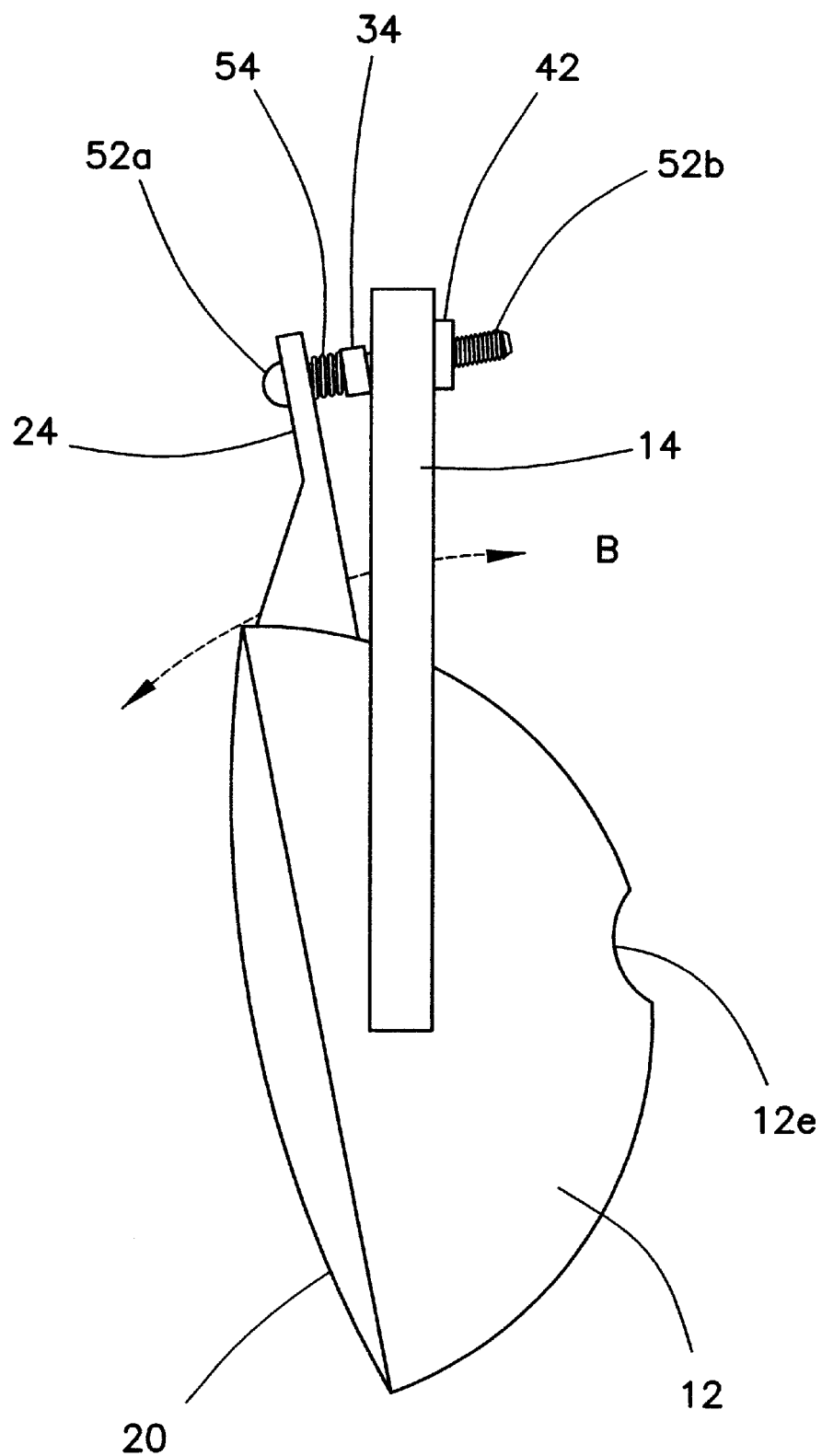
FIG. 5 is a right side view of the assembled lamp of FIG. 1.

The flexible line of weakness of the living hinges 16 is the result of reduced wall thicknesses of the wings 28 and arms 46 at their mutual interface. The line of weakness allows for pivotable movement between the bracket 14 and housing 12. As shown in FIG. 4, the line of weakness is formed by opposed beveled edges 48 and 50, which edges reduce the material thickness at the arms-wings interface to provide a point at which the member can flex.

Broadly, the adjusting mechanism, designated generally by reference character 18, includes externally threaded adjusting screw 52, socket member 34, and spring 54. The screw 52 is comprised of a head portion 52a rotatably extending through hole 26 in tab 24 and a threaded shank portion 52b projecting rearwardly from the tab 24. The screw 52 may be rotated in either direction from in front of the lamp.

It is understood that the head of the screw 52 is larger than hole 26 and sits against tab 24 of the housing 12. The threaded shank portion 52b is threadably engaged to the bracket 14 via a complimentary threaded hole 38 in socket member 34. The thread engagement converts axial rotation of the screw 52 to lateral movement, the direction of which depends on the direction of axial rotation of screw 52.

Spring 54 is dimensioned to surround screw 52 between tab 24 and socket member 34. Spring 54 provides bias against the tab 24 urging the forward surface of the tab 24 to remain seated against the flat under surface of screw head 52a. Thus, the screw 52 is restrained from axial displacement relative to the tab 24. It is to be understood, however, that the present invention functions equally well with other adjuster mechanisms.

With reference now to FIGS. 1–5, the operational aspects which occur during the vertical adjustment of lamp assembly 10 will be discussed. Following either the installation of lamp assembly 10 or at a necessary time during service life, it may be necessary to adjust the vertical aim of a light beam emanating from lamp assembly 10. As mentioned, this is accomplished by causing lamp assembly 10 to pivot about the horizontal axis of the living hinge defined by lines of weakness along axis A.

Aiming adjustment of the lamp assembly 10 with respect to the vehicle is achieved by axially rotating adjusting screw 52 thus pivoting housing 12 about horizontal axis A. Depending on the direction of rotation of adjusting, the threads of socket member 34 will translate the rotational motion of screw 52 into linear displacement either in the forward-rear directions with respect to the bracket 14. Because tab 24 on the housing 12 is in mechanical communication with the screw 52, the translation of rotational motion into linear motion causes housing 12 to pivot about its horizontal axis A. Thus, by rotating screw 52 clockwise, tab 24 is urged inward against the biasing spring 54 and the lamp rotates upward. Conversely, by partially unscrewing the screw 52 allowing the biasing spring 54 to urge tab 24 forward, the lamp body rotates downward. The liner motion of the screw 52 causes the housing 12 to pivot through an arc B about an axis A in order to adjust the vertical alignment of lamp assembly 10 in the configuration shown in FIG. 1. The pivotable motion is provided by the integral living hinges 16.

Those of ordinary skill in the art will recognize from the foregoing description the exceptional benefits of the present invention. A housing and mounting bracket of the lamp assembly according to the present invention may, because they are a single piece, be constructed via injection molding in a single mold. Further, the integral living hinges of the present invention provide pivotable retention with fewer components than prior art assemblies. Thus, not only are fewer components necessary than prior art retention assemblies, but assembly and installation of the lamp of the present invention is simplified. Therefore, a lamp is disclosed that is efficient in its design and manufacture and not overly complex or expensive to manufacture and install.

Although the invention has been herein shown and described in what is perceived to be the most practical and preferred embodiment, it is to be understood that the invention is not intended to be limited to the specific embodiments set forth above. Rather, it is recognized that modifications may be made by one of skill in the art of the invention without departing from the spirit or intent of the invention and therefore, the invention is to be taken as including all reasonable equivalents to the subject matter of the appended claims.

What is claimed is:

1. A vehicle lamp assembly comprising:
   a reflector housing having an open front end adapted to receive and retain a lens, a rear end opposite the front end adapted to receive a bulb, said housing configured to reflect light from said bulb through said lens;
   a mounting bracket adapted to be mounted to the vehicle, said housing and said mounting bracket being molded as a one-piece assembly with the housing and the mounting bracket being joined along at least one integral living hinge, said integral hinge pivotably supporting the housing and defining a pivoting axis about which the housing is pivotably adjustable in relation to the mounting bracket so that the orientation of the housing with respect to said bracket may be adjusted.

2. The vehicle lamp assembly of claim 1, further comprising an adjuster for adjusting the orientation of the housing with respect to the mounting bracket to direct light emitted from the assembly in a selected direction, the adjuster disposed between the mounting bracket and the housing and engaging the housing such that the adjuster is capable of adjusting the orientation of the housing.

3. The vehicle lamp assembly of claim 2, wherein the adjuster comprises:
   a screw having a head for engaging the housing and a threaded shaft portion retained in a threaded opening on the mounting bracket such that rotation of the screw is translated into linear motion along an axis perpendicular to the pivoting axis, and
   a spring disposed between the mounting bracket and the housing biasing the housing towards the screw head so as to maintain the screw head in contact with the housing as the screw is rotated.

4. A lamp assembly comprising:
   a housing having an open front end adapted to receive and retain a lens and a rear end adapted to receive and retain a bulb remote from the lens;
   a mounting bracket adapted for mounting on a motor vehicle;
   a pair of integral living hinges integrally joining said housing and said mounting bracket in a single unitary molded assembly, said hinges pivotably coupling said housing and said mounting bracket so as to allow adjustable aiming movement of said housing with respect to said mounting bracket; and
   an adjuster disposed between said housing and said mounting bracket for adjusting the position of said housing with respect to said mounting bracket to direct light emitted from the assembly in a selected direction, said adjuster adapted to engage said housing such that said adjuster is capable of pivoting said housing with respect to said mounting bracket along said hinges.

5. The lamp assembly of claim 4, wherein the adjuster comprises:
   a screw having a head for engaging the housing and a threaded shaft portion retained in a threaded opening on the mounting bracket such that rotation of the screw is translated into linear motion in the fore or aft direction depending on the direction of rotation; and
   a spring disposed between said mounting bracket and the said housing biasing the housing towards the screw head so as to maintain the housing in contact with the screw head as the screw is rotated and the housing is adjusted.

6. A vehicle lamp assembly for emitting light having one-piece construction, comprising:
   a housing pivotably coupled to a mounting bracket as a single unitary unit by a pair of integral living hinges, molded in a single mold; said integral living hinges defining a flexible line of weakness between them to allow said housing to be pivoted with respect to said bracket; and
   an adjuster for adjusting the position of the housing with respect to the mounting bracket to direct light emitted from the assembly in a selected direction, the adjuster disposed between the mounting bracket and the housing and engaging the housing such that the adjuster is capable of adjusting the position of the housing in relation to the bracket.

7. The lamp assembly of claim 6, wherein the housing has an open front end adapted to receive and retain a lens and a rear end adapted to receive and retain a bulb remote from the lens.

8. The lamp assembly of claim 6, wherein the mounting bracket is adapted for mounting in a motor vehicle.

9. A lamp assembly comprising:

a housing having an open front end adapted to receive and retain a lens and a rear end adapted to receive and retain a bulb remote from the lens;

a tab integrally molded with said housing and extending radially outwardly from said housing adjacent the open end of said housing, the tab configured to be operable by an adjusting mechanism;

a mounting bracket adapted for mounting on a motor vehicle;

an adjuster disposed between said tab and said mounting bracket for adjusting the position of said housing with respect to said mounting bracket to direct light emitted from the assembly in a selected direction, said adjuster adapted to engage said tab such that said adjuster is capable of continuously adjusting the position of said housing with respect to said mounting bracket; and a pair of integral living hinges integrally molded between said housing and said mounting bracket for pivotably coupling said housing and said mounting bracket so as to allow adjustable aiming movement of said housing with respect to said mounting bracket as directed by said adjuster.

10. The lamp assembly of claim 9, wherein the adjuster comprises:

a screw having a head and a threaded shaft portion threadedly engaging the mounting bracket such that rotation of the screw is translated into linear motion in the fore or aft direction depending on the direction of rotation; and a spring disposed between said mounting bracket and the said housing biasing the housing towards the screw head so as to maintain the selected orientation of the housing with respect to the mounting bracket as the screw is adjusted.

11. The lamp assembly of claim 9 wherein the lamp assembly is a one-piece unitary molded assembly.

12. A method for pivotably adjusting the aim of a lamp, comprising the steps of:

providing a one-piece housing and bracket joined at a pair of integral living hinges, the integral living hinges pivotably supporting said housing and defining a pivoting axis about which said housing is pivotable;

providing an adjuster for causing the housing to pivotably rotate with respect to the bracket so as to effect adjustment of the aim of the lamp; and adjusting the aim of the lamp by operating the adjuster.

13. A method for aiming a lamp the type having a housing and bracket of one-piece construction comprising the steps of:

pivotably coupling between the housing and bracket via a pair of integrally molded living hinges;

providing an adjuster for directing the housing to pivotably rotate along said hinges so as to effect adjustment of the aim of the lamp;

adjusting the aim of the lamp by operating the adjuster.

14. A method for adjusting the aim of light emitted from a lamp assembly comprising:

providing a housing with an open front and adapted to receive and retain a lens and a bulb remote from the lens;

providing a bracket adapted for mounting in a motor vehicle;

pivotably coupling said housing to said bracket by a pair of integrally molded living hinges;

providing an adjuster for directing the housing to pivotably rotate about said hinges so as to effect adjustment of the aim of the lamp; and operating the adjuster to adjust the aim of the lamp.

* * * * *